April 12, 1955     E. J. CAPSTACK ET AL     2,706,031
PACKAGE CONVEYING AND ORIENTING APPARATUS
Filed April 14, 1952     2 Sheets-Sheet 1
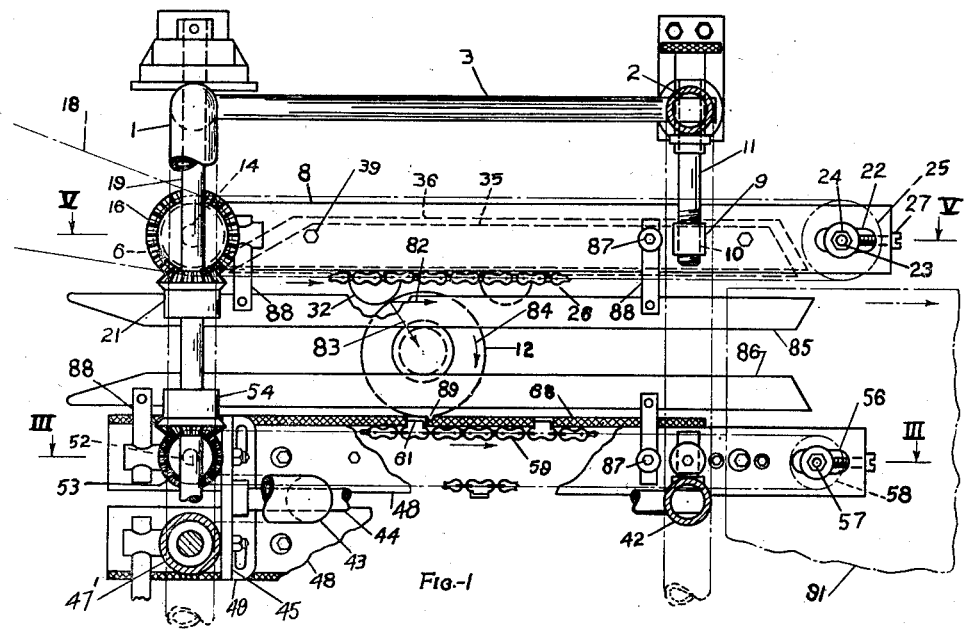
INVENTOR.
EUGENE J. CAPSTACK
+ RALPH DAVIS
BY
Arthur J. Robert
ATTORNEY April 12, 1955   E. J. CAPSTACK ET AL   2,706,031
PACKAGE CONVEYING AND ORIENTING APPARATUS
Filed April 14, 1952   2 Sheets-Sheet 2
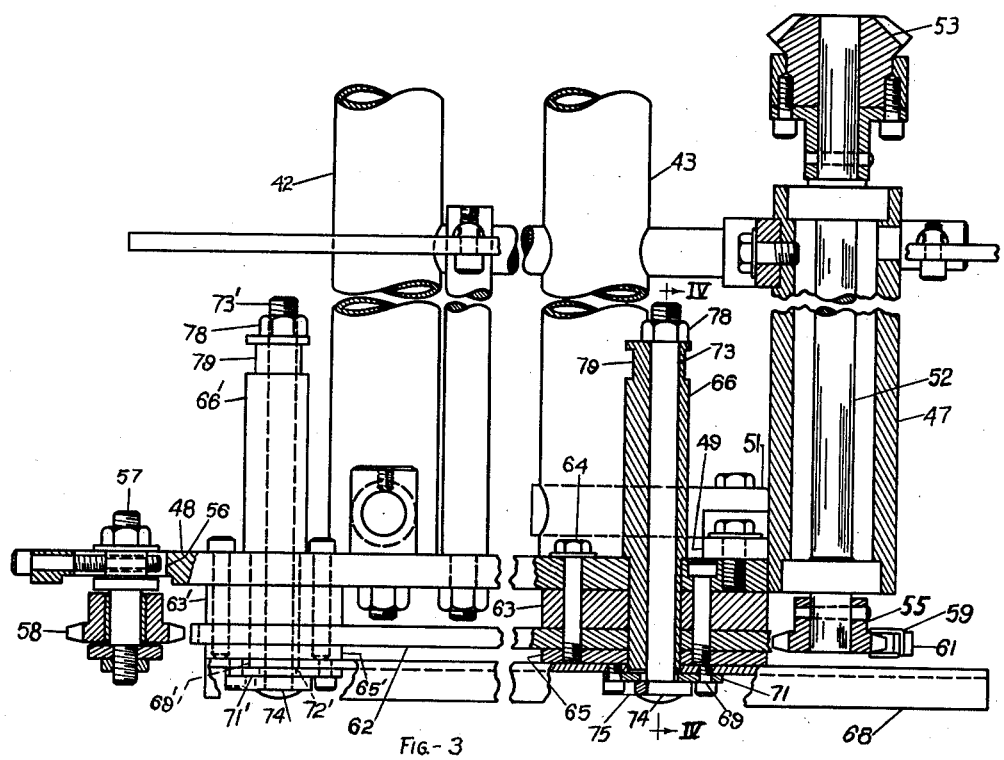
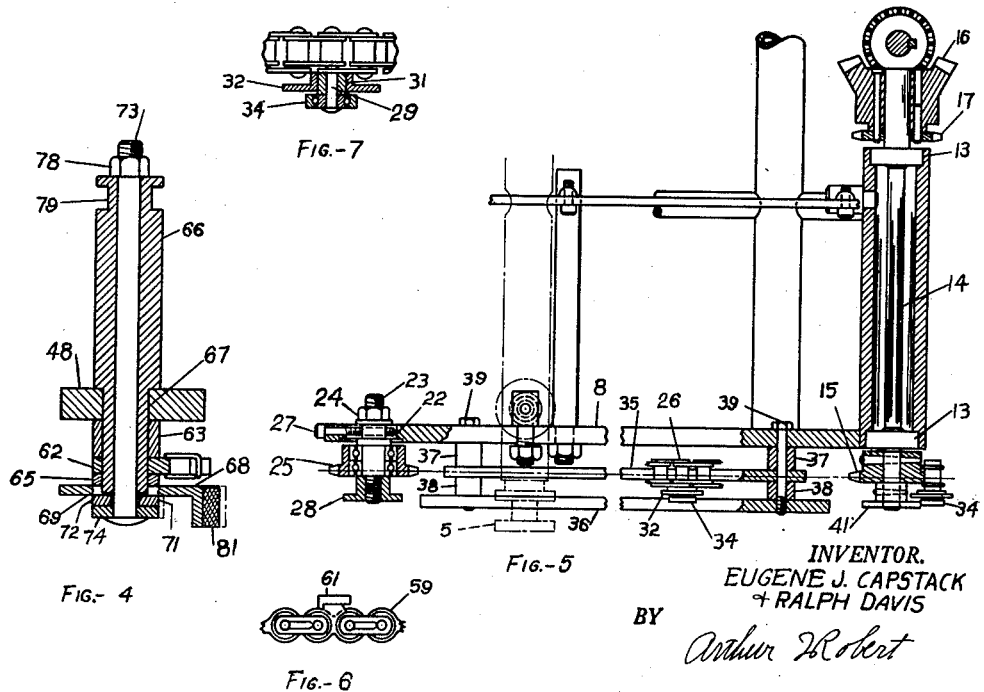
INVENTOR.
EUGENE J. CAPSTACK
+ RALPH DAVIS
BY
Arthur H. Robert
ATTORNEY

United States Patent Office 2,706,031
Patented Apr. 12, 1955

2,706,031

PACKAGE CONVEYING AND ORIENTING APPARATUS

Eugene J. Capstack and Ralph E. Davis, Louisville, Ky., assignors to Joseph E. Seagram & Sons, Inc., Shively, Ky., a corporation of Indiana Application April 14, 1952, Serial No. 282,207

3 Claims. (Cl. 198—33)

The present invention relates to article orienting apparatus, and relates in particular to apparatus for conveying bottles or the like and orienting the bottle to present the proper surface for attachment of a label or the like to the bottle.

It is an object of the invention to provide a simplified machine for conveying and orienting packages and the like.

According to the present invention there is combined with an article conveying and turning device, a means to relieve or substantially eliminate the turning force on the article when the article reaches oriented position, while the article continues to be conveyed. In the preferred form of apparatus as applied to a bottle orienting device, the bottle is conveyed along a path and at the same time is biased transversely to cooperate with a friction or abutment member along the path which may be stationary or moving, to thus set up a force couple that turns the bottle as it advances. The bottle carries either a raised or depressed reference member. A cooperating feeler member moves along the path with the bottle adjacent the friction member, and when the reference member on the bottle turns to and engages this feeler member one force of the force couple acting on the bottle is relieved or eliminated thus stopping the rotation of the bottle. The cooperating feeler member can also supply a force on the bottle acting in the direction the bottle is being conveyed and can serve to engage the bottle to resist further turning, thus eliminating the danger of accidental displacement of the bottle as it is conveyed. At the end of the orienting apparatus the bottle can be picked up by a belt conveyor or may be fed into a bottle labeling machine, or into any other apparatus.

The apparatus can be used for articles of different diameters by adjusting the space between the abutment member and the biasing member. The conveying member employed may be a pusher or a belt may be used as a conveyor and biasing member. The apparatus can serve to automatically space the articles on the conveyor, by locating the feelers at a predetermined spacing not less than the circumference of the articles to be oriented.

The invention will be described in greater detail in connection with the accompanying drawing illustrating a preferred embodiment of the invention by way of example, and wherein:

Figure 1 is a plan view with parts broken away of an embodiment of the invention;

Figure 2 is an end view of Figure 1 as seen from the left, with parts broken away;

Figure 3 is a section taken on line III—III of Figure 1 with parts broken away;

Figure 4 is a section taken on line IV—IV of Figure 3;

Figure 5 is a sectional view taken on line V—V of Figure 1;

Figure 6 is an enlarged plan view of the feeler and a fragment of its chain;

Figure 7 is an enlarged sectional view of a fragment of the conveyor chain and a pusher roller.

Referring to the drawing the apparatus comprises an inverted U-shaped tubular rear frame member 1 and a similar U-shaped front member 2 having bars 3 joining them together. The frame thus formed is arranged to straddle a surface 4, which may be fixed, as shown, adapted to receive the article to be oriented. The frame can be adjusted vertically by means of screw threaded feet 5. A vertical rear sleeve 6 is suitably fastened to the frame by adjustable stay rods 7, 7' and adjacent its bottom carries a plate 8 which may be welded thereto at one end. The front end of the plate 8 carries a block 9 having a screw threaded bore 10 therein, and an adjusting screw 11 passing through a bushing in the frame can be turned to adjust the end of the plate up or down (as seen in Figure 1). The plate 8 is arranged on one side of the path of movement of the article 12 to be oriented, which is illustrated as a bottle. The sleeve 6 contains suitable ball bearings 13, (Fig. 5) in which is journalled a vertical shaft 14 having a sprocket wheel 15 keyed thereto at the bottom. At its top the shaft carries a crown miter gear 16 and a sprocket 17 secured thereto by which a feeding device (not shown) may be driven by a chain 18. Transverse shaft 19 journalled in suitable bearings at the ends of the rear frame is driven in any suitable manner and carries a miter gear 21 splined thereon and meshing with gear 16 by which shaft 14 is driven. The splined gear 21 is adjustable along the shaft 19 and is held in adjusted position by a set screw or the like.

At its outer end plate 8 has a slot 22 and a threaded shouldered stud 23 in the slot is clamped in position by a nut 24 and suitable washers. The stud carries suitable ball bearings on which a sprocket 25 is journalled, and a chain 26 extends around the sprockets 15, 25. The tension of this chain can be adjusted by a screw 27 threaded through the stud and passing through the end of plate 8. The bottom end of the stud carries a flanged guide 28, held thereon in any suitable manner, as by a locking screw, for a purpose to be presently explained. Chain 26 is of the flat link and roller type and as seen in Figure 7, has a long pin 29 positioned at intervals and peened to hold the links in place. A sleeve or spacer 31 on the pin carries a roller 32, and a ball bearing roller 34 is held on the pin 29 by peening over the end. Guide plates 35, 36 are carried by plate 8 by means of spacers 37, 38 and bolts 39. In operation the edge of plate 35 fits between the plates of chain 26 to support the chain against sagging, and the roller 34 bears against the edge of guide bar 36. At the idling end, while the chain passes around the sprocket 25 the roller 34 bears on the guide 28 and at the driving end, while the chain passes around the sprocket 15, the roller 34 bears on a guide flange 41 keyed to the shaft 14.

A vertical middle post 42 extends down from the front frame 2 and the rear vertical middle post 43 is joined to the rear frame in offset position by a suitable bend or elbow. A bar 44 extending from post 43 is received in the socket of a cross plate 45 and a pair of sleeves 47, 47' are fastened thereto. The bottom of sleeve 47 carries a plate 48 welded thereto and a similar plate 48' is carried by sleeve 47'. The apparatus shown embodies two orienting units, and sleeve 47' and plate 48' form part of the next adjacent unit but only one unit will be described in detail. A cross tie 49 is secured to the plates 48, 48' by bolts and spacers, and is fastened to a bar 51 extending from post 43, whereby the sleeves are supported from the frame. Sleeve 47 has bearings in which are journalled a vertical shaft 52, this shaft being driven by meshing miter gears 53, 54 on the shaft 52 and transverse drive shaft 19 respectively. At the bottom shaft 52 carries a sprocket 55 keyed thereto. Plate 48 has a slot 56 at its end (similar to slot 22) in which is similarly fastened a stud 57 having a sprocket 58 journalled thereon. A chain 59 passes around the sprockets 55, 58 and at intervals carries feeler members 61. These feeler members are in the form of bosses welded to the side links of chain 59 as seen more clearly in Figure 6.

The plate 48 carries a guide plate 62 secured thereto by spacers 63, 63' and bolts 64, the latter being threaded into clamping plates 65, 65'. A pair of shouldered cam rods 66, 66' have their reduced ends passing through close fitting openings 67 in the plate 48 and through aligned openings in spacers 63, 63' guide plate 62 and clamping plates 65, 65'. An abutment bar 68, which is L-shaped in cross section has oval clearance openings 69, 69' into which the ends of rods 66, 66' extend. A pair of plates 71, 71' are bolted to the bottom of abutment bar 68, and such plates each has an oval slot 72, 72' respectively, the axis of which extend longitudinally of the bar. Bolts or studs 73, 73' pass eccentrically through bars 66, 66' their lower ends acting as a cam in slots 72, 72' and each bolt has a plate 74 welded thereto, this plate having a slot 75 to accommodate one of the bolts holding plates 71, 71' in place, and which cooperates therewith to prevent the studs 73, 73' from turning. At the top the studs receive a nut 78 and the rods 66, 66' each has a flat or noncircular part 79 to receive a wrench. It will be seen that when nut 78 is released and rod 66 is turned the stud 73 passing through slot 72 and held by its head plate 74 from turning is shifted to the right or left as seen in Figure 4, thus shifting plate 72 and abutment bar 68 with it, and this provides a lateral adjustment of bar 68. After the bar is adjusted it is held by tightening nut 78. Abutment bar 68 has a facing 81 of a suitable material having a high coefficient of friction, as for example, woven asbestos brake lining.

From the apparatus so far described it will be seen (Figures 1 and 2) that a roller 32 engages a bottle 12 on the surface 4, and as the roller is advanced by the chain 26 it pushes the bottle ahead, sliding the bottle along surface 4, and urges the bottle transversely against the abutment bar 68, as indicated by the vector arrows 82, 83. The friction between the abutment bar and the bottle and the advancing force on the bottle indicated by vector 82 produce a force couple which causes the bottle to rotate in the direction indicated by arrow 84 as it advances. To prevent or limit canting or tilting of the bottle, a pair of guide bars 85, 86 are provided to engage the bottle neck. These guides are supported by the chain plates 8, 48 by means of posts 87 and cross bars 88.

The chain 59 moves at the same lineal speed as the roller 32 and bottle, and the feeler 61 is slightly set back from the vertical plane of the friction surface of bar 68, as seen in Figures 1 and 4. The exact amount of offset or set back may be adjusted by means of cams 65, 66' acting on the abutment bar 68 to move the abutment bar plane the proper distance from the feeler. The bottle has a projection or teat 89 suitably located, and when this teat is brought into engagement with the feeler 61 the rotation of the bottle is arrested, and as the feeler 61 is moving ahead at the same rate as the roller 32, the force couple is broken or relieved, thus relieving the rotating force on the bottle. The bottle now is properly oriented, and is pushed along without rotating by the conjoint action of roller 32 and feeler 61 in properly oriented position to the end of plate 4, where the bottle is picked up by a belt conveyor 91 or any other type of mechanism.

The apparatus is adjustable for different diameter bottles. For a larger bottle the stays 7, 7' are adjusted to the left as seen in Figure 2, thus providing a wider spacing between the rollers 32 and the friction bar 68. The neck guides also may be adjusted. Miter gear 21 can be shifted as required on shaft 19 to maintain good driving engagement with gear 16, and the adjustment screw 11 shifts the end of plate 8 as required.

Various modifications of the invention may be made without departing from the spirit or scope thereof. For example, the surface 4 may act as a friction member to cause turning of the bottle, as for example, by adjusting a neck guide 86 to allow the bottle to tilt slightly. Or, either the conveyor member or the abutment member may be resiliently biased toward the article, in which case the feeler should maintain its predetermined relationship with respect to the member located on its side of the path of movement. Thus, for example, where a resiliently biased friction member is employed and the feeler is on the same side of the article, the feeler and friction member should maintain the offset relationship, and likewise when the conveyor member and feeler are on the same side of the article, the feeler and conveyor member should be biased to maintain their relationship.

We claim as our invention:

1. In a conveying and orienting device for an article having a circular portion: abutment means arranged along the path of movement of said article conveying means for moving said article along said path; means on one side of the center line of said path to urge said article transversely of said path of movement against said abutment means to impart a rotating movement to the article as it is moved along said path; an endless chain; and contact means carried on said chain arranged on the same side of the center line of said path as the abutment means and adjacent said abutment means and advancing along said path of movement in synchronism with said conveying means in position to engage a predetermined point on the article to relieve the pressure of the article against said abutment means and stop rotation thereof while said conveyor means continues movement of said article along said path.

2. In a conveying and orienting device for circular articles: means presenting a substantially plane surface to receive said articles; a friction member arranged along the path of movement adjacent said surface; an endless band located in spaced relation to said friction member along said surface, said band carrying projecting means adapted to contact an article on said surface to convey the article along said surface and press the article transversely against the friction surface to cause the article to rotate as it is conveyed; and a second contact member movable in synchronism with the first contact member along said friction surface to contact said article to relieve the pressure between the article and friction surface.

3. In a conveying and orienting device for circular articles: a friction member arranged along a path of movement of articles; conveying means located in spaced relation to said friction member carrying projecting means adapted to contact an article to convey said article and press said article transversely against said friction member to cause the article to rotate as it is conveyed; and a second contact member located on the same side of the path of movement as the friction member movable in synchronism with the conveying means along said friction member to contact said article at a predetermined point to arrest rotation of the article and relieve the pressure between the article and friction member.

References Cited in the file of this patent

UNITED STATES PATENTS

| | | |
|---|---|---|
| 2,106,997 | Fenner | Feb. 1, 1938 |
| 2,159,318 | Carter | May 23, 1939 |

FOREIGN PATENTS

| | | |
|---|---|---|
| 655,271 | Germany | Jan. 12, 1938 |